US008514179B2

(12) United States Patent
Griffin

(10) Patent No.: US 8,514,179 B2
(45) Date of Patent: Aug. 20, 2013

(54) HANDHELD ELECTRONIC COMMUNICATION DEVICE HAVING AN AGE COMPENSATING DISPLAY

(75) Inventor: Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 299 days.

(21) Appl. No.: 12/977,283

(22) Filed: Dec. 23, 2010

(65) Prior Publication Data

US 2012/0165073 A1 Jun. 28, 2012

(51) Int. Cl.
*G09G 5/00* (2006.01)

(52) U.S. Cl.
USPC ............... 345/169; 345/76; 345/90; 345/211

(58) Field of Classification Search
USPC ................. 345/76, 78, 90, 211, 690
See application file for complete search history.

(56) References Cited

U.S. PATENT DOCUMENTS

| 5,894,298 | A | 4/1999 | Hoeksma |
| 5,900,090 | A | 5/1999 | Distefano et al. |
| 6,243,595 | B1 | 6/2001 | Lee et al. |
| 6,332,084 | B1 | 12/2001 | Shaanan et al. |
| 6,501,230 | B1 * | 12/2002 | Feldman .................... 315/169.3 |
| 6,850,226 | B2 | 2/2005 | Finke-Anlauff |
| 6,963,756 | B2 | 11/2005 | Lubowicki et al. |
| 7,388,578 | B2 | 6/2008 | Tao |
| 7,400,345 | B2 | 7/2008 | Cok |
| 7,580,736 | B2 | 8/2009 | Ronkko et al. |
| 7,692,667 | B2 | 4/2010 | Nguyen et al. |
| 2002/0006813 | A1 | 1/2002 | Lubowicki et al. |
| 2003/0171133 | A1 * | 9/2003 | Mizuta et al. ................. 455/550 |
| 2004/0032382 | A1 | 2/2004 | Cok et al. |
| 2004/0070558 | A1 | 4/2004 | Cok et al. |
| 2004/0150590 | A1 | 8/2004 | Cok et al. |
| 2004/0229662 | A1 | 11/2004 | Chadha |
| 2005/0096082 | A1 | 5/2005 | Chang |
| 2005/0233785 | A1 | 10/2005 | Park et al. |

(Continued)

FOREIGN PATENT DOCUMENTS

| EP | 1291840 A2 | 3/2003 |
| EP | 1307030 A2 | 5/2003 |

(Continued)

OTHER PUBLICATIONS

Extended European Search Report dated May 20, 2011 issued for corresponding EP Appln. No. 10196721.4.

(Continued)

*Primary Examiner* — Amare Mengistu
*Assistant Examiner* — Premal Patel
(74) *Attorney, Agent, or Firm* — Ridout & Maybee LLP

(57) ABSTRACT

A method and handheld electronic device for compensating for differential aging of display screen on a handheld electronic device wherein in a first position a first portion of the display screen is hidden from view while a second portion of the display screen is viewable, and in a second position the first portion and the second portion of the display screen are viewable. Over time, relative illumination durations of the first and second portions are tracked and based on the relative illumination durations, a relative degree of illumination of one or both of the first portion and the second portion are adjusted when the display screen is in the second position to compensate for differential aging between the first and second portion.

18 Claims, 9 Drawing Sheets

(56) References Cited

U.S. PATENT DOCUMENTS

| | | |
|---|---|---|
| 2006/0077135 A1* | 4/2006 | Cok et al. .................. 345/76 |
| 2006/0077136 A1* | 4/2006 | Cok ........................... 345/76 |
| 2006/0087588 A1* | 4/2006 | Cok ........................... 348/556 |
| 2007/0024576 A1 | 2/2007 | Hassan |
| 2007/0109284 A1 | 5/2007 | Yamazaki et al. |
| 2007/0115255 A1 | 5/2007 | Pan |
| 2007/0177404 A1 | 8/2007 | Daniel et al. |
| 2007/0247798 A1 | 10/2007 | Scott, II |
| 2007/0285401 A1 | 12/2007 | Ohki et al. |
| 2007/0287504 A1 | 12/2007 | Lim et al. |
| 2008/0144265 A1 | 6/2008 | Aoki |
| 2008/0207273 A1 | 8/2008 | Huo |
| 2008/0226970 A1 | 9/2008 | Kim et al. |
| 2008/0268901 A1 | 10/2008 | Miramontes |
| 2008/0284767 A1 | 11/2008 | Mori et al. |
| 2009/0075692 A1 | 3/2009 | Park et al. |
| 2009/0154082 A1 | 6/2009 | Nurmi et al. |
| 2009/0156264 A1 | 6/2009 | Cho et al. |
| 2009/0167644 A1* | 7/2009 | White et al. ............... 345/76 |
| 2009/0174628 A1 | 7/2009 | Wang et al. |
| 2009/0195499 A1 | 8/2009 | Griffin |
| 2009/0231785 A1 | 9/2009 | Li et al. |
| 2010/0245227 A1 | 9/2010 | Chen et al. |

FOREIGN PATENT DOCUMENTS

| | | |
|---|---|---|
| EP | 1603311 A2 | 12/2005 |
| EP | 1858236 A1 | 11/2007 |
| EP | 1931118 A2 | 6/2008 |
| EP | 1944949 A1 | 7/2008 |
| GB | 2417851 A | 3/2006 |
| JP | 2004 144819 A | 5/2004 |
| JP | 2006 330222 A | 12/2006 |
| WO | 03030497 A2 | 4/2003 |
| WO | 2008074358 A1 | 6/2008 |
| WO | 2010044902 A1 | 4/2010 |

OTHER PUBLICATIONS

JP 20030298694 A—Abstract—Portable Electronic Device.

U.S. Appl. No. 12/858,528, filed Aug. 18, 2010.

* cited by examiner

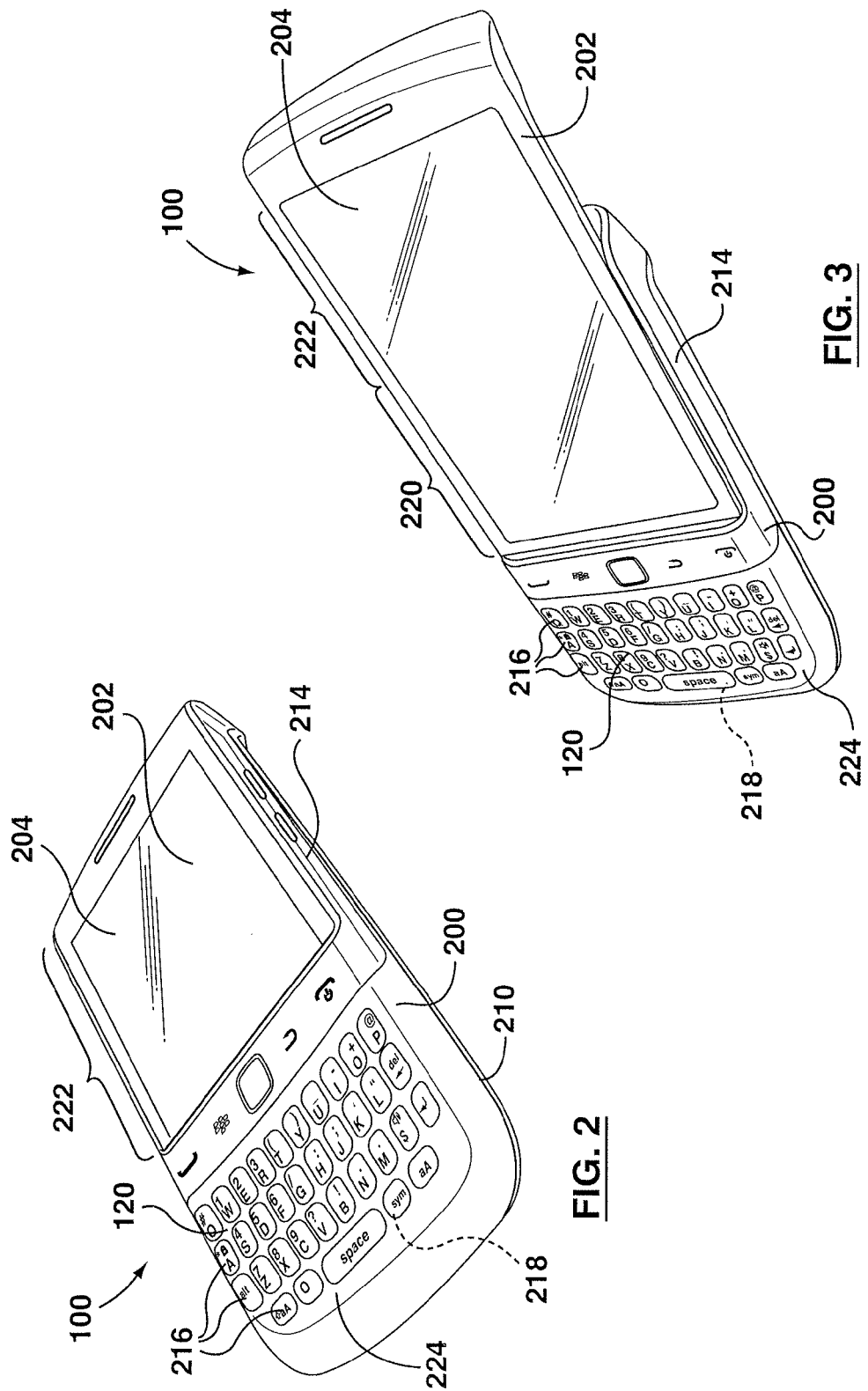

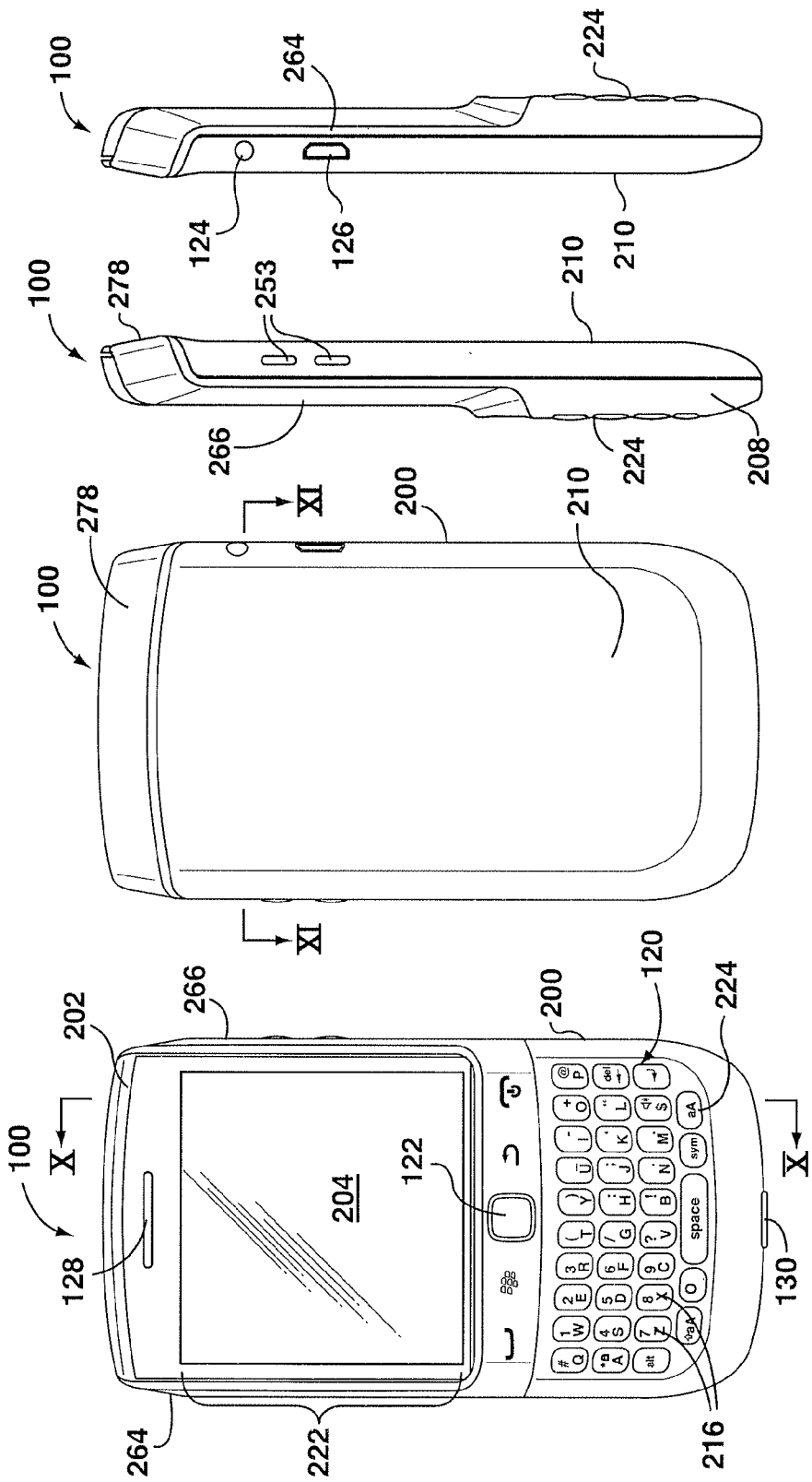

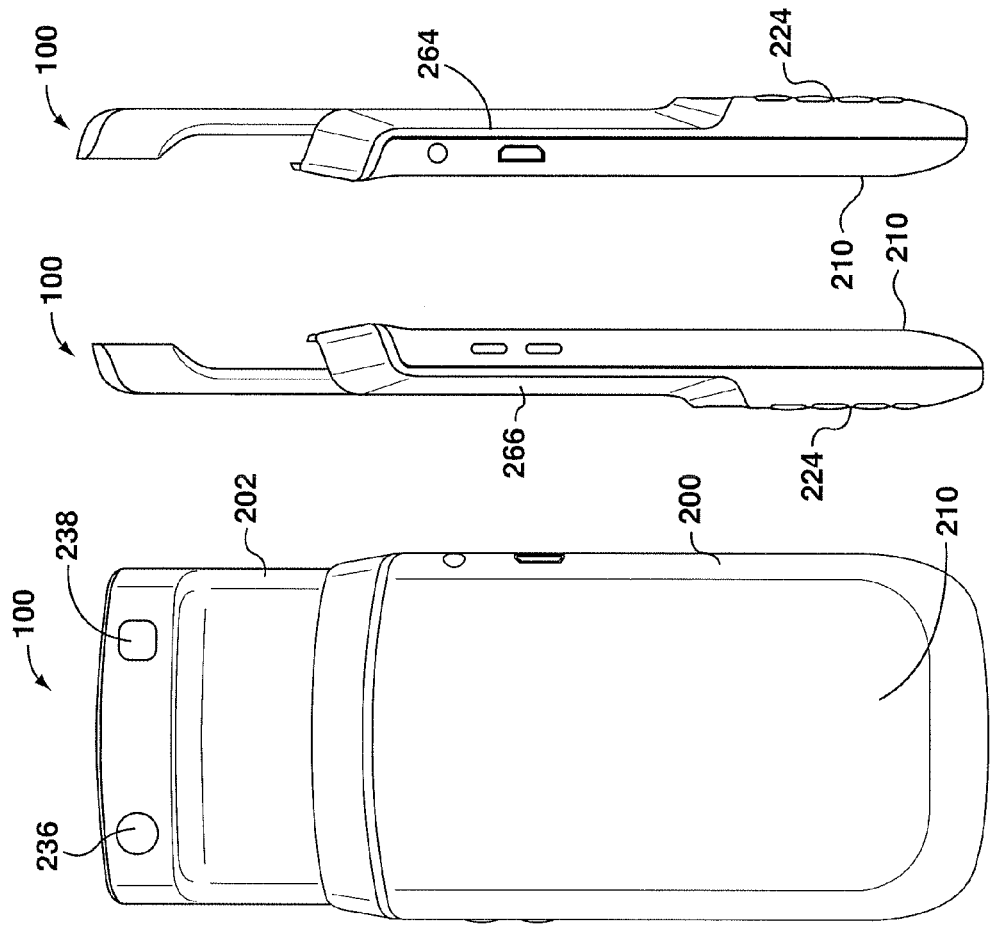
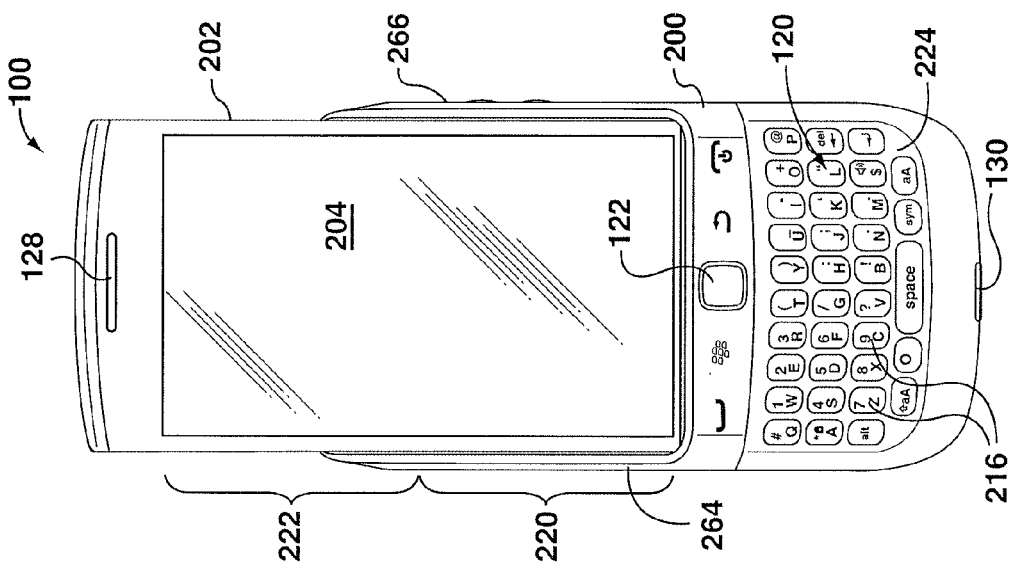

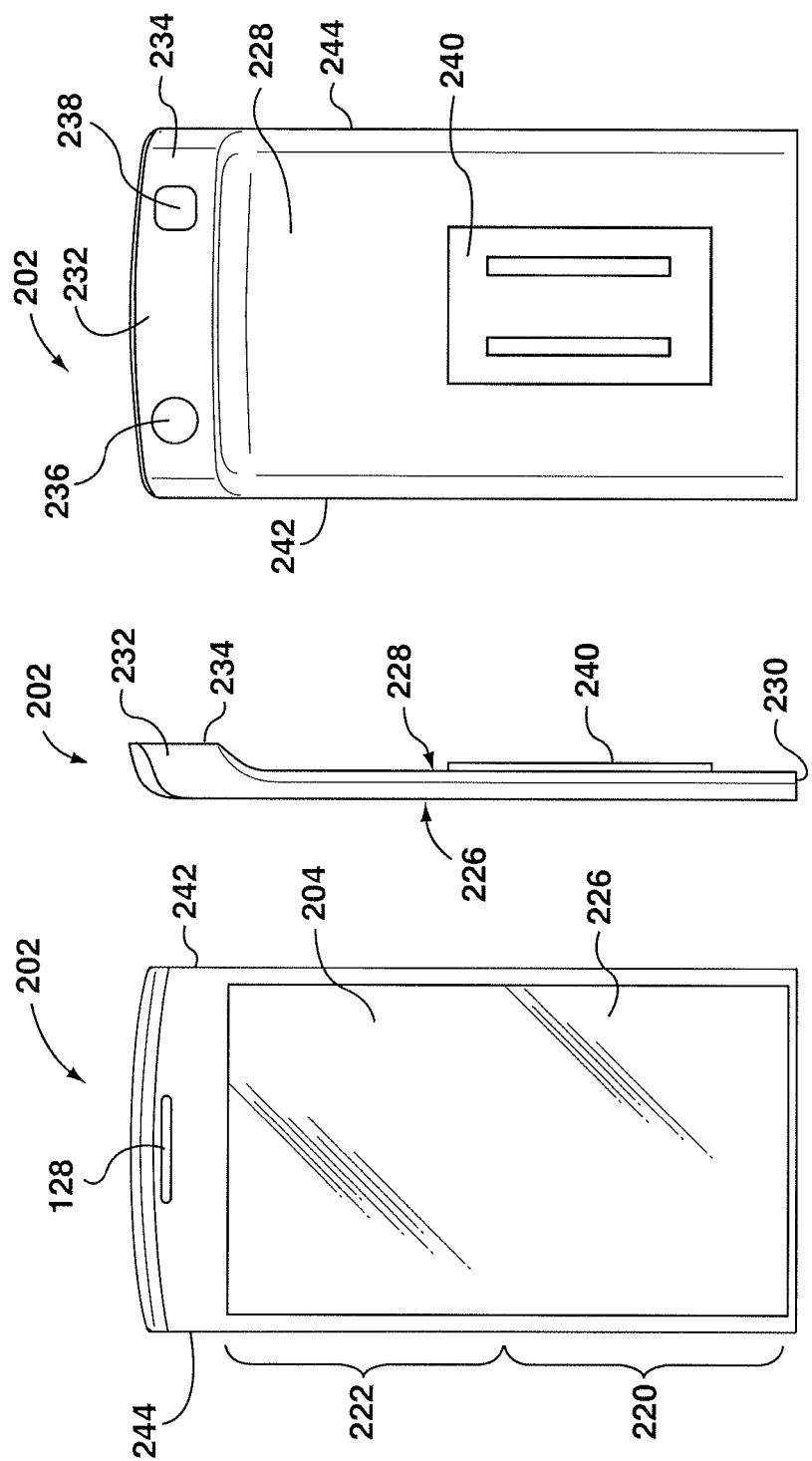

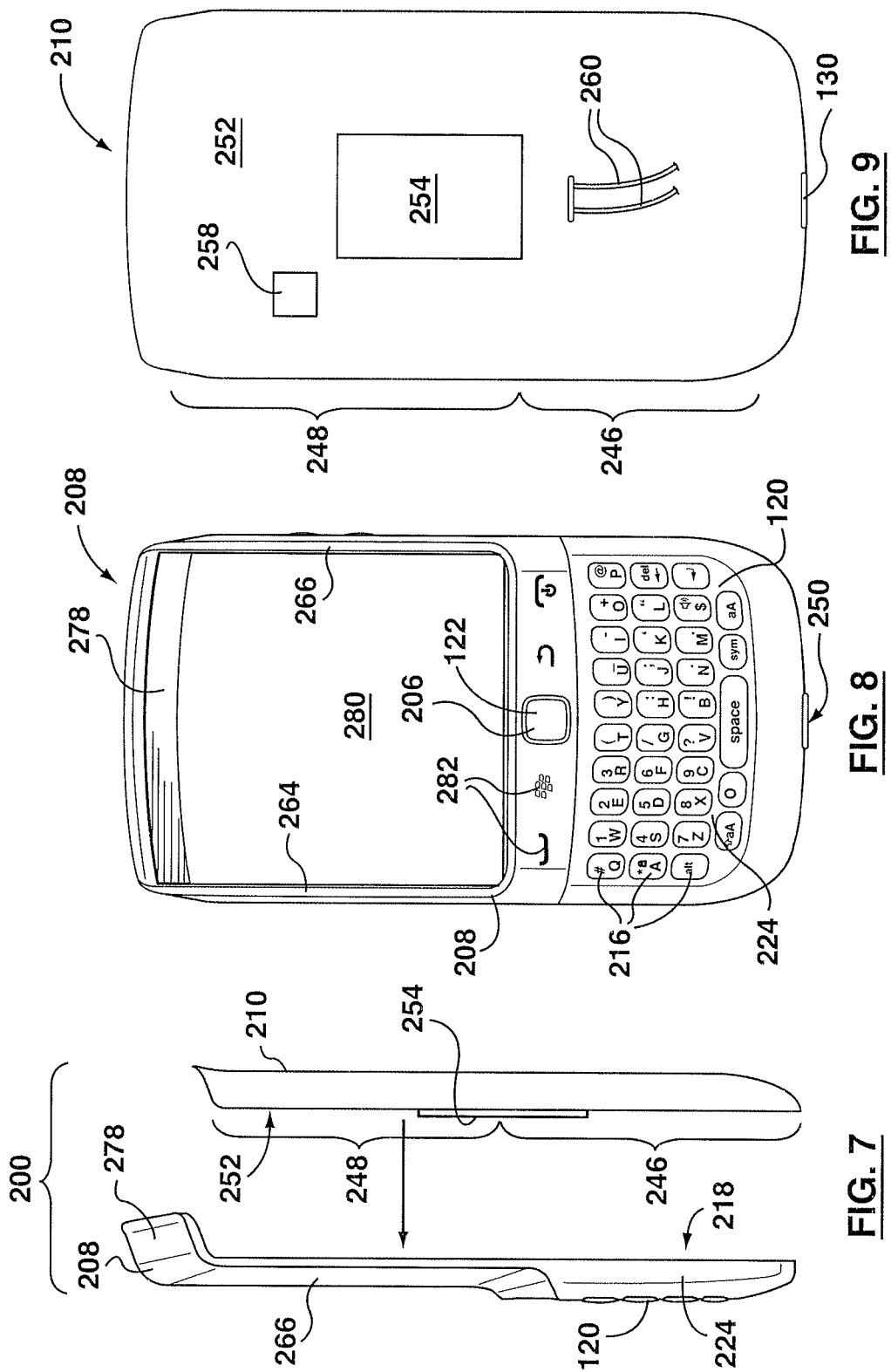

HANDHELD ELECTRONIC COMMUNICATION DEVICE HAVING AN AGE COMPENSATING DISPLAY

FIELD OF TECHNOLOGY

The present disclosure relates to electronic devices, including handheld electronic communication devices having a display that is subject to differential aging.

BACKGROUND

Electronic devices, including handheld electronic communication devices, have gained widespread use and may provide a variety of functions including, for example, telephonic, electronic text messaging, personal information manager (PIM) application functions, mobile web browsing, and audio and video playback, among other things. Sliding displays are sometimes used on electronic devices.

In environments where regions of a display screen are illuminated differently, differential aging of the display screen regions can occur over time.

BRIEF DESCRIPTION OF THE DRAWINGS

Embodiments of the present disclosure will now be described, by way of example only, with reference to the attached Figures, wherein:

FIG. 2 is a perspective view of an example of a handheld electronic communication device including a display assembly in a retracted position;

FIG. 3 is a perspective view of the handheld electronic communication device of FIG. 2 showing the display assembly in an extended position;

FIG. 4A is a front view of the handheld electronic communication device of FIG. 2 showing the display assembly in the retracted position;

FIG. 4B is a back view of the handheld electronic communication device of FIG. 2 showing the display assembly in the retracted position;

FIG. 4C is a right side view of the handheld electronic communication device of FIG. 2 showing the display assembly in the retracted position;

FIG. 4D is a left side view of the handheld electronic communication device of FIG. 2 showing the display assembly in the retracted position;

FIG. 5A is a front view of the handheld electronic communication device of FIG. 2 showing the display assembly in the extended position;

FIG. 5B is a back view of the handheld electronic communication device of FIG. 2 showing the display assembly in the extended position;

FIG. 5C is a right side view of the handheld electronic communication device of FIG. 2 showing the display assembly in the extended position;

FIG. 5D is a left side view of the handheld electronic communication device of FIG. 2 showing the display assembly in the extended position;

FIG. 6A is a front view of a display assembly of the handheld electronic communication device of FIG. 2;

FIG. 6B is a back view of the display assembly of FIG. 6A;

FIG. 6C is a side view of the display assembly of FIG. 6A;

FIG. 7 is an exploded side view of a housing of the handheld electronic communication device of FIG. 2;

FIG. 8 is a front view of a front housing member of the housing of FIG. 7;

FIG. 9 is a front view of a base of the housing of FIG. 7;

DETAILED DESCRIPTION

Figure 1:
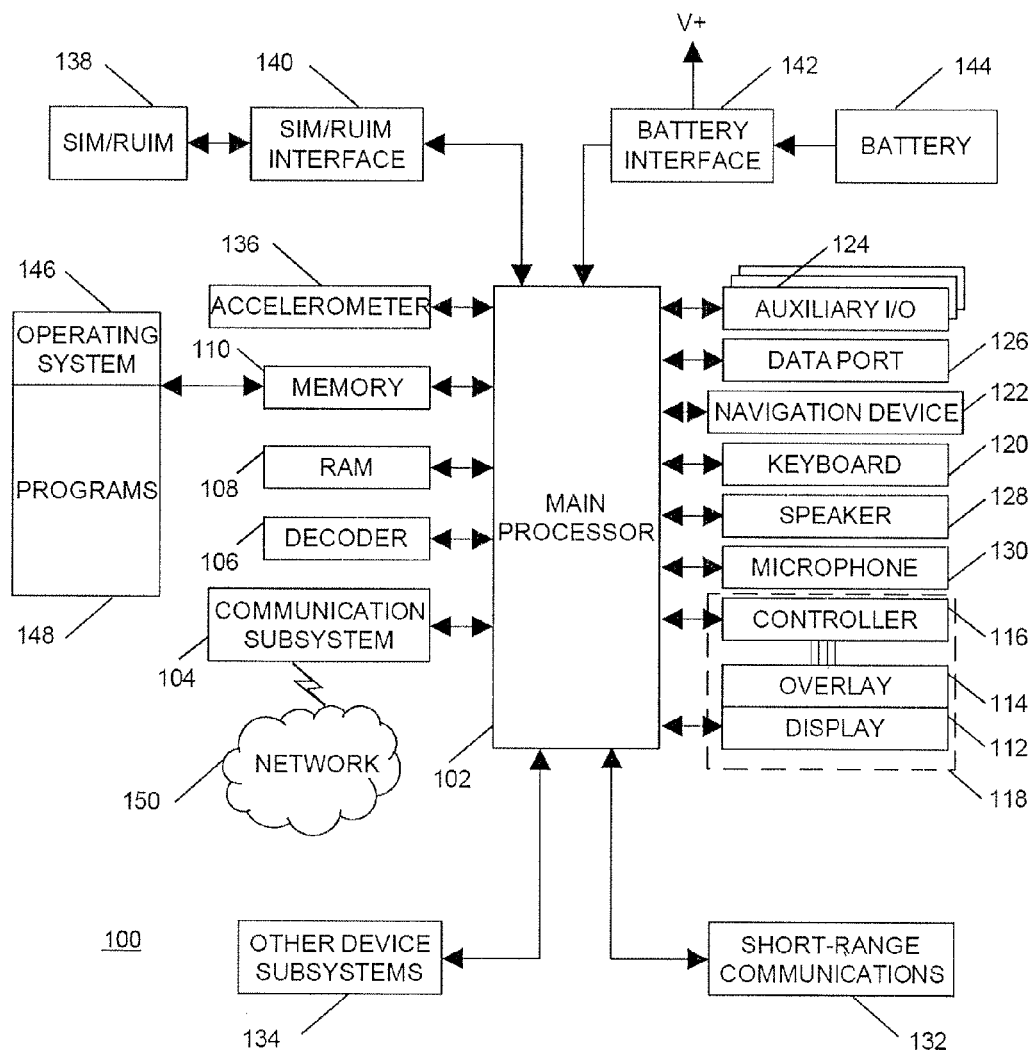
FIG. 1 is a simplified block diagram of components including internal components of a handheld electronic communication device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to an example aspect is a method for compensating for differential aging of a display screen on a handheld electronic device, wherein in a first position a first portion of the display screen is hidden from view while a second portion of the display screen is viewable, and in a second position the first portion and the second portion of the display screen are viewable, comprising: tracking over time relative illumination durations of the first and second portions; and based on the relative illumination durations, adjusting a relative degree of illumination of one or both of the first portion and the second portion when the display screen is in the second position to compensate for differential aging between the first and second portion.

According to another example aspect is a handheld electronic device that includes: a first assembly; a display assembly including a display screen, the display assembly and first assembly being movable relative to each other between a first position in which a first portion of the display screen is hidden from view by the first assembly while a second portion of the display screen is viewable and a second position in which both the first portion and second portion are viewable; a processor configured to control operation of the display screen; a position sensor for providing position information to the processor indicating if the display assembly and first assembly are in the first position or the second position; the processor being configured to disable illumination of the first portion of the display screen and enable illumination of the second portion of the display screen when the position information indicates the first position, and enable illumination of both the first and second portions when the position information indicates the second position, the processor being configured to track over time relative illumination durations of the first portion and the second portion and adjust, in dependence on the tracked relative illumination durations, a relative degree of illumination of one or both of the first portion and the second portion to compensate for differential display screen aging.

According to an example aspect is a method for compensating for differential aging of a movable display screen on a handheld electronic device, the display screen being movable between a retracted position and an extended position, wherein in the retracted position a first portion of the display screen is hidden from view while a second portion of the display screen is viewable, and in the extended position the first portion and the second portion of the display screen are viewable. Relative illumination durations of the first and second portions are tracked over time, and based on the relative illumination durations, a relative degree of illumination of one or both of the first portion and the second portion are adjusted when the display screen is in the extended position to compensate for differential aging between the first and second portion.

According to an example aspect is a handheld electronic device comprising: a housing defining a cavity; a display assembly slidably mounted to the housing and comprising a display screen on a front face thereof, the display assembly being slidable between a retracted position and an extended position, wherein in the retracted position a lower portion of the display screen is received within the cavity and an upper portion of the display screen is viewable outside of the cavity, and in the extended position the lower portion and the upper portion of the display screen are viewable outside of the cavity; a processor configured to control operation of the display screen; and a position sensor for providing display assembly position information to the processor indicating if the display assembly is in the retracted position or extended position. The processor is configured to disable illumination of the lower portion of the display screen and enable illumination of the upper portion of the display screen when the display assembly is in the retracted position, and enable illumination of both the upper and lower portions when the display assembly is in the extended position, the processor being configured to track over time relative illumination durations of the lower portion and the upper portion and adjust, in dependence on the tracked relative illumination durations, a relative degree of illumination of one or both of the lower portion and the upper portion when the display assembly is in the extended position to compensate for differential display screen aging.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. In some examples, wireless network 150 is a conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. In some examples, wireless network 150 includes a wireless network which, in some embodiments, conforms to IEEE 802.11x standards (sometimes referred to as Wi-Fi) such as, for example, one or more of the IEEE 802.11a, 802.11b, 802.11g and 802.11n standards. Other communication protocols may be used for the network 150 include for example IEEE 802.20 (also referred to as Mobile Wireless Broadband Access). In some examples communication subsystem 104 could include two or more communications subsystems for communicating with two or more different types of wireless networks—for example a wireless wide area network communication subsystem for EDGE or GPRS communications and a wireless local area network communication subsystem for Wi-Fi communications. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an input device such as keyboard 120, an optional navigation device 122, an auxiliary input/output (I/O) subsystem 124, a data port 126, a speaker 128, a microphone 130, short-range communications 132 (which for example could include a Bluetooth™ interface or infrared interface, among other things) and other device subsystems 134. User-interaction with the graphical user interface may be performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. Although the touch-sensitive display 118 is described as comprising a display 112 and an overlay 114, the touch-sensing components may overlay the display 112 or, alternatively, may be integrated into the display 112.

The display 112 comprises one or more display devices which allow an upper and a lower portion of the display to be separately or concurrently illuminated. In one example, the display 112 is an organic light emitted diode (OLED) device having pixels that can be selectively illuminated in groups or individually. In another example, the display 112 is a liquid crystal display (LCD) with light-emitting diode (LED) backlighting which can selectively illuminate individual or clusters of pixels. In yet another example, the display 112 is an LCD with two or more cold cathode fluorescent lamps (CCFLs) to provide selective backlighting for two or more sections of the display 112. Notwithstanding these examples, the display can comprise any type of device or combination of devices that can make up separately illuminatable display regions.

The display 112 is also configurable to emit different levels of brightness or degrees of illumination. The degrees of illumination of the upper and lower portions of the display 112 can be separately controlled by the processor 102. In some examples, depending on the type of display device being used, the relative degrees of illumination may be changed by adjusting the brightness, the contrast, the color balance or a combination of these factors.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Figure 10:
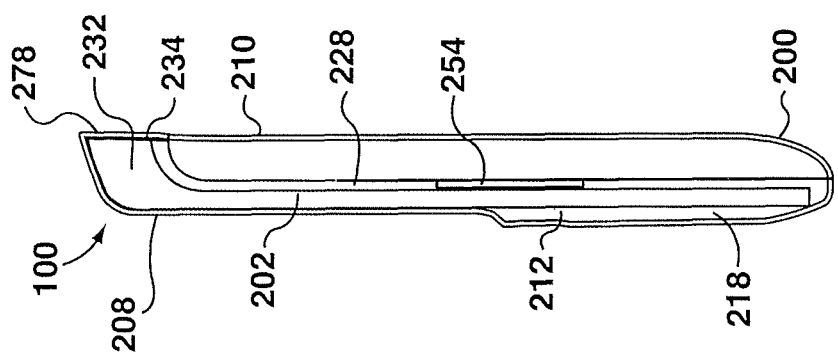
FIG. 10 is a schematic sectional view of the handheld electronic communication device of FIG. 2, taken along lines X-X of FIG. 4A.

Referring to FIGS. 2, 3, 4A-4D and 5A-5D views of an example of the handheld electronic communications device 100 are shown. The handheld electronic communication device 100 includes a first assembly such as a housing assembly 200 having a longitudinal axis and a sliding display screen assembly 202 that is mounted to the housing to slide axially between a first or retracted position as shown in FIGS. 2 and 4A-4D and a second or extended position as shown in FIGS. 3 and 5A-5D. The housing assembly 200 includes a base 210 and a keyboard support member 224 in which a plurality of forward facing user input keys 216 of the keyboard 120 are disposed. A cavity 218, as best seen in sectional view of FIG. 10, and indicated by dashed reference line in FIGS. 2 and 3, is defined between a front surface of the base 210 and a back surface of the keyboard support member 224. The sliding display assembly 202 includes a display screen 204 (which in one example includes display 112 and touch sensitive overlay 114) on its front face. The display screen 204 has a first or lower portion 220 and a second or upper portion 222. When the display assembly 202 is in the retracted position as shown in FIG. 2, the lower portion 220 of the display screen 204 is received within the cavity 218 of housing assembly 200 underlying the keyboard support member 224 such that the lower portion 220 is hidden from view, and the upper portion 222 of the display screen 204 extends from an open end of the cavity 218 and is exposed and viewable from a front of the device. When the display assembly 202 is in the extended position as shown in FIG. 3, the lower portion 220 of the display assembly is positioned out of the cavity 218 such that both the lower portion 220 and the upper portion 222 of the display screen 204 are viewable.

The sliding display assembly 202 may in at least some examples enable a compact size for the handheld electronic communication device 100 when the display assembly is retracted while providing a larger viewable display screen area when the display assembly is extended. The keyboard 120 is exposed and fully accessible from a front of the handheld electronic communication device 100 when the display assembly 202 is in both the retracted and extended positions.

The housing assembly 200 and the display assembly 202 may both house components of the handheld electronic communication device 100, including the components described and shown in FIG. 1. Referring to FIGS. 6A-6C, an example of the display assembly 202 will now be explained in greater detail. The display assembly 202 has a first or lower terminal end 230 that is received within the housing cavity 218 at least when the display assembly 202 is in the retracted position, and a second or upper terminal end 232 at its opposite end. The display assembly 202 has a substantially planar front face 226 which includes a viewable surface of the display screen 204, an opposite facing back face 228 and longitudinal side edges 242 and 244. The back face 228 is substantially planar over most of the length of the display assembly 202, however the upper terminal end 232 defines an enlarged boss portion 234 that has a back face that is spaced further back from the display assembly front face 226 than the rest of the back face 228. In one example, the enlarged boss portion 234 houses an optical sensor 236 that faces outward from the back face of the display assembly 202 for capturing one or both of photo or video image data. A flash or illuminator 238 may also be housed in the enlarged boss portion 234 for illuminating objects that are the subject of image capture by the optical sensor 236.

As can be seen in the retracted position back view of FIG. 4B and the extended position back view of FIG. 5B, in at least some examples the optical sensor 236 and illuminator 238 are concealed by the housing assembly 200 when the display assembly 202 is in its retracted position, but are exposed when the display assembly 202 is in its extended position.

Referring again to FIGS. 6A to 6C, in the illustrated example, device speaker 128 is housed in the enlarged boss portion 234 at the upper end 232 of the display assembly 202, and is oriented to output sound from the upper end 232 of the front face 226. In some examples, a sliding assembly member 240 is provided on the back face 228 of the display assembly 202 for slidably mounting the display assembly to a front face of the housing base 210.

Referring to FIGS. 7-9, an example of the housing assembly 200 will now be explained in greater detail. As noted above, the housing assembly 200 includes a base 210 and a keyboard support member 224. In one example, the keyboard support member 224 is part of a front housing unit 208. As shown in FIGS. 7 and 9, base 210 has substantially planar front face 252 with a first or lower section 246 and a second or upper section 248. The front face of the base lower section 246 is arranged in spaced opposition to the keyboard support member 224 to form cavity 218, and the base upper section 248 extends from the first section 246 beyond the open end of the cavity 218. The front face of upper section 248 faces the back face 228 of the display assembly 202. In some examples of handheld communication device 100, many of the components of the device shown in FIG. 1 are located within the base 210 including for example the main processor 102, RAM 108, memory 110, and communication subsystems 104 and 132. In one example, microphone 130 is located at a lower end of the base as illustrated in FIG. 9. An opening or slot 250 (see FIG. 8) may be provided in a lower end of the front housing unit 208 in alignment with the microphone 130. One or more antennas of one or both of the communications subsystem 104 and 132 may also be positioned at or near the lower end of the base 210. In some example embodiments, one or more data ports 126 and auxiliary I/O interfaces 124 can be provided on side edges of the base 210. For example, as seen in FIG. 4D, a data port 126 in the form of a USB port and an I/O interface 124 in the form of an audio/microphone jack are provided on a side edge of the upper section of base 210. As seen in FIG. 4C, physical user input buttons such as volume control buttons 253 that are operatively connected to the processor 102 can also be located on side edges of the base 210.

Referring again to FIG. 9, a slider assembly member 254 can be provided on the front face 252 of the base 210. The slider assembly member 254 of the base 210 cooperates with the slider assembly member 240 of the sliding display assembly 202 to collectively provide a sliding assembly 256 (FIG. 10) that slidably connects the display assembly 202 to the base 210. Any different number of known sliding assembly configurations could be used to implement sliding assembly 256, including but not limited to slider assemblies that incorporate one or both of springs and/or electric motors to assist in moving the sliding component and retaining the sliding component in a desired position. In at least some examples a flex connector 260 extends between the base 210 and the sliding assembly 256 to provide an electrical link between components housed within the display assembly 202 and components housed within the base 210. In some example configurations, other communications links could be provided between base components and display assembly components, including for example optical or RF links.

One or more position sensors 258 can be provided on the base 210 or the display assembly 202 for detecting the position of the display assembly 202 relative to the housing assembly 200. For example, a Hall effect sensor may be utilized to detect a position or positions of the display assembly 202 relative to the housing assembly 200. According to another example, a mechanical switch or switches are used.

With reference to FIGS. 7 and 8, the keyboard support member 224 forms a lower portion of front housing unit 208 and supports keyboard 120. In one example, keyboard 120 includes a plurality of depressible alphanumeric keys 216 which may be arranged in rows and columns with a standard keyboard layout (e.g. QWERT, DVORAK, etc.). In some examples, the keyboard 120 may include a respective dome switch associated with each of the keys 216, however many different keyboard configurations could be used to implement keyboard 120.

In one example embodiment, a number of function keys 282 and a navigation device 122 are provided in a row along on the keyboard support member 120 between the keyboard 120 and the display screen. Function keys 282 are operatively connected to the processor 102 to initiate predetermined device functions such as initiate a phone call, terminate a phone call, and return to previous screen, among other things. The navigation device 122 responds to user interaction and can be used for navigating around the display screen 204, to select objects on the display screen 204 and for other purposes. The navigation device 122 can act as a cursor navigational tool and in some examples, the navigation device 122 can consist of an optically based user input device such as an optical joystick that uses an optical sensor pad 206 to detect relative movements of a finger. The optically based navigation device 122 can be used to instruct two-dimensional screen cursor movement in substantially any direction, as well as act as an actuator when the optically based navigation device 122 is depressed like a button. In some examples, where an optical sensor pad is used to implement navigation device 122, the optical sensor pad has a low profile so that it is generally flush with the front of the keyboard support member 224 and does not protrude extensively behind the keyboard support member. In some examples, navigation device 122 could alternatively be a trackball, touchpad, physical joystick, directional keys or key pad.

In an example, the front housing unit 208 includes opposed first and second sidewalls 264 and 266 that extend from the keyboard support member 224 along respective axial side edges of the upper section 248 of base 210. At the upper end of the housing unit, the sidewalls 264 and 266 are connected by a cross member 278. The cross member 278, sidewalls 264 and 266 and keyboard support member 224 collectively define a rectangular opening 280 through which the display assembly 202 can be viewed. Referring to the sectional view of FIG. 11, in one example sidewalls 264 and 266 each protrude away from the front face 252 of base 210 so that the screen assembly 202 is located between the sidewalls 264 and 266. As can be seen in FIG. 4A, when the screen assembly 202 is in its retracted position, the upper portion 222 of the display screen 204 is located between sidewalls 264 and 266 with the side edges of the screen assembly 202 concealed by sidewalls 264 and 266. In the extended position, as seen in FIG. 5A, at least part of the upper portion 222 of the display screen extends beyond the upper ends of the sidewalls 264.

Figure 11:
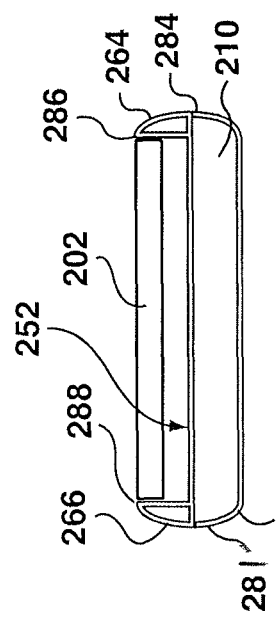
FIG. 11 is a schematic sectional view of the handheld electronic communication device of FIG. 2, taken along lines XI-XI of FIG. 4B.

Referring again to the sectional view of FIG. 11, in one example, an outer surface of the sidewall 266 together with an outer side edge surface 282 of the base 210 forms one side edge of the communication device 100 and an outer surface of the sidewall 264 together with an outer side edge surface 284 of the base 210 forms an opposite side edge of the communication device 100. In one example, along the sides of rectangular opening 280 (FIG. 8) the terminal edges 286, 288 of the sidewalls 264, 266 that face away from the front surface 252 of the base 210 are located in plane that is slightly higher than a front viewing surface of the display screen 204. In another example, along the sides of rectangular opening 280 the terminal edges 286, 288 of the sidewalls 264, 266 that face away from the front surface 252 of the base 210 are located in plane that is substantially flush with a front viewing surface of the display screen 204.

Referring again to FIGS. 7, 8 and 10, in one example the cross member 278 that extends between the upper ends of the sidewalls 264, 266 is offset back towards the base 210 relative to the sidewalls 264, 266 such that the cross member 278 is located behind the back face of the enlarged boss portion 234 of the upper end 232 of the display assembly 202. In such an example, the cross member 278 forms the upper terminal end of the housing assembly 200 and provides a recess in the housing assembly 200 for receiving the enlarged display assembly boss portion 234 when the display assembly is in its retracted position, and conceals the optical sensor 236 and illuminator 238 that are located the back face of the enlarged boss portion 234. As seen in FIGS. 4C and 4B, when the display assembly 202 is in its retracted position its upper end 232 is coterminous with the upper end of the housing assembly 200 such that the housing assembly 200 covers substantially the entire back surface of the display assembly 202.

In one example, the sidewalls 264, 268 protect the side edges of the display assembly 202 when the display assembly is in its retracted position, and also provide opposed surfaces for gripping the handheld electronic communication device 100 between the palm and fingers of a hand without interfering with movement of the display assembly. In one embodiment the sidewalls 264, 268 are respectively spaced apart such that a user can grip one side edge of the communication device 100 with fingers of a hand, grip the opposite side edge with the palm of the same hand and have the thumb free to either extend or retract the display assembly 202 or actuate the navigation device 122.

As indicated above the communication device 100 may include one or more sensors 258 that indicate one or more relative positions of the display assembly 200 to the processor 102. In examples the processor 102 is configured to modify operational characteristics of the display screen 204 in dependence on the sensed position of display assembly 200. In one example embodiment, one or more sensors 258 are used to indicate if the display screen 204 is extended with the entire viewable area of display screen 204 is visible or is retracted with the lower portion 220 of the display screen hidden from view and only the upper portion 222 visible.

In one example, where the display screen 204 is an OLED (organic light emitting diode) display or is an LCD with LED backlighting having pixels that can be selectively illuminated, when the processor 102 detects that the display assembly 204 is retracted, the processor 102 can disable the illumination of pixels that are in the lower portion 220 of the display screen 204 that is received within recess 218, while still enabling illumination of the pixels of upper display screen portion 222. In another example, where the display screen 204 is an LCD with separately illuminatable backlights, when the processor 102 detects that the display assembly 202 is retracted, the processor 102 can disable the illumination of the backlight for the lower portion 220 of the display screen 204 that is received within the recess 218 while still enabling illumination of the pixels of the upper display screen portion 222. The feature of enabling the upper portion 222 of the display screen 204 to be active while disabling the lower portion 220 of the display screen so that it is not active when retracted can in some configurations facilitate power conservation but may also result in differential aging of different portions of the display screen 204 due to the different durations of time during which the different portions are illuminated. Over time, the differential aging may result in different illumination intensities between the upper and lower screen portions if the differential is not accounted for.

Figure 14:
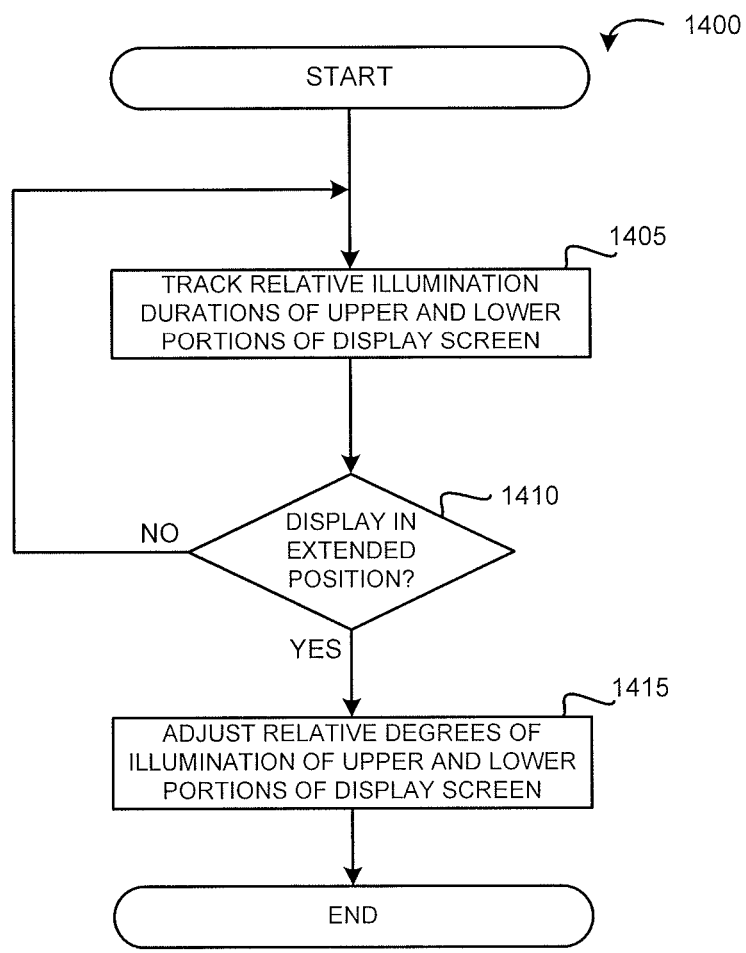
FIG. 14 is an example flowchart of a method for compensating for differential aging of a sliding display on a handheld electronic device.

Referring to FIG. 14, a method 1400 for compensating for the differential aging of the display screen 204 is illustrated. The method of FIG. 14 may for example be implemented by the processor 102 as configured by operating system software 146 or other software programs 148 or a combination thereof. In step 1405, the processor 102 is configured to track the relative durations of time for which the upper 222 and lower 220 portions of the display screen 204 are active or illuminated based on information from one or more screen position sensors 258 and clock information. In one example, the processor is configured to track the duration of time during which the screen is illuminated (e.g. when pixels on the display screen are activated to display information) and the position of the display screen 204 during these periods. As illumination of the lower portion 220 is disabled when the display assembly 202 is retracted, the relative illumination durations of the upper and lower portions can be determined from duration of time during which the display screen 204 is illuminated and extended, and the duration of time during which the display screen 204 is illuminated and retracted. One or more timers or counters can be used to measure the length of time for which the display screen 204 is illuminated and retracted, and the length of time for which the display screen 204 is illuminated and extended. The timer or counter may be implemented as hardware or software components (or combinations thereof) on the handheld electronic device 100. The timer or counter may be calibrated using external references such as a network clock signal or a GPS clock signal, for example.

In some examples, the processor 102 is configured to store in persistent memory 110 illumination information that represents the cumulative total time that the display screen 204 is active or illuminated in the extended position (such "active extended time" being representative of an illumination duration for both the upper portion 222 and the lower portion 220) and the cumulative total time that the display screen is active or illuminated in the retracted position (such "active retracted time" being representative of an illumination duration for the upper portion 222 alone while the lower portion 220 is inactive) In example embodiments, the cumulative "active extended time" and "active retracted time" totals stored in memory 110 can be updated at periodic intervals while the display screen 204 is actively displaying information, or at points when the display screen 204 goes from an active display state to an inactive or blank state, or combinations of the forgoing.

In some examples the display screen brightness or illumination level can be adjusted by a user of the device to conserve battery power or adjust for different lighting conditions. In some example embodiments, in addition to simply tracking when the display screen is active in the extended or retracted positions, the processor is also configured to factor in the brightness or illumination level during each period of illumination for the upper and lower portions 222, 220 of the display screen 204 when updating the cumulative "active extended time" and "active retracted time" totals. In this example, the illumination duration is adjusted by an illumination factor that is based on the currently set illumination level during the period of illumination. For example, if it has been determined that the display screen 204 ages 25% slower when the display is illuminated at 75% of its maximum brightness, for any period of illumination at this level of illumination, the relative illumination duration will be 25% less than the actual illumination duration. This factor by which the actual illumination duration is reduced is referred to herein as the illumination factor. In an example embodiment, the illumination factors for different levels of brightness are predetermined for an average display device and are stored in the handheld electronic device memory 110 and the illumination duration for a tracked period of illumination is adjusted by the appropriate illumination factor when updating the cumulative active extended time" and "active retracted time" totals. Alternatively, an equation for determining the illumination factor based on the configured illumination level can be used, and then the calculated illumination factor applied to adjust the illumination duration before adding the duration to the total "active extended time" or "active retracted time" as the case may be.

Referring again to FIG. 14, in step 1410, when the display screen 204 is extended as seen in FIG. 3, the processor, in step 1415, adjusts the relative degrees of illumination of one or both of the upper and lower portions 222, 220 of the display screen 204 by a compensation factor to compensate for the differential aging of the two portions to compensate for the fact that in the absence of compensation, as portions of the display screen 204 age, the effective degree of illumination (i.e. the degree of illumination outputted and perceived by a user) for portions that have been illuminated a greater amount may be lower than the effective degree of illumination for display screen portions that have been illuminated a lesser amount.

In one example, the compensation factor applied by the processor is configured to dim the degree of illumination of the lower portion 220 based on the difference in relative illumination durations between the upper and lower portions 222, 220. In another example, the processor is configured to increase the effective degree of illumination of the upper portion 222 to compensate for the difference in illumination durations. In yet another example, the processor adjusts the relative degrees of the illumination of both the upper and lower portions based on the relative illumination durations. In some examples, the compensation factor is determined using the "active extended time" and "active retracted time" as inputs to an equation derived from average performance characteristics of test display screens. In some examples the compensation factor is determined using the "active extended time" and "active retracted time" as inputs for a look-up table stored in the device memory that is derived from average performance characteristics of test display screens.

In one example, the processor adjusts the degrees of illumination of both the upper and lower portions based on an aging factor. The aging factor is based on the aging characteristics of the display screen 204 and changes as the relative duration of illumination changes. In one example, the aging factor may be a ratio of the current maximum illumination achievable with the aged display device to the original maximum illumination. In another example, the aging factor may be an amount by which the illumination of the display device must be increased or decreased to achieve a predetermined effective degree of illumination. The aging factors may be predetermined by test measurements of the illumination output of a representative display screen, and are stored in the memory 110 of the handheld electronic device 100.

Accordingly, based on the relative cumulative illumination durations between the upper and lower portions 222, 220 and the corresponding aging factors, the processor adjusts the degrees of illumination of pixels within one or both of the upper portion 222 and lower portion 220 to mitigate the perceivable difference in aging between the upper and lower portions.

In some examples, the processor is configured to only adjust the degrees of illumination in step 1415 after a predetermined display screen age threshold has been reached. By way of example, prior to performing step 1415, a qualification step may be performed to determine if a cumulative illumination duration threshold based on one or both of the "active retracted duration" or "active extended duration" has reached a threshold cumulative time, and if not, then the age compensation of step 1415 is not performed. In other examples, the processor is configured to only adjust the degrees of illumination in step 1415 after a predetermined device age has been exceeded. The predetermined illumination duration or the predetermined device age may, for example, represent an average display device usage or aging after which must be exceeded by a perceivable difference is noticeable in the display output.

In some examples, a user may be able to manually adjust the aging factors used when adjusting the relative degrees of illumination of the upper and lower portions of the display screen. The processor can be configured to enter the handheld electronic device into a calibration mode whereby the user may adjust the degrees of illumination of the upper and lower portions until the difference in brightness between the upper and lower portions are minimal. Once this process is complete, the processor can store a correction factor or adjust the aging factors for use in future adjustments to the relative degrees of illumination.

In one example, the display device is an OLED or other device comprising different types of subpixels such as red, green and blue subpixels. Different color subpixels may be susceptible to different aging characteristics, and to compensate for this the processor may be configured to adjust the relative degrees of illumination for the different subpixels using different or independent compensation factors for the different subpixel colors to compensate for differential aging of the different subpixels.

In some example applications the above described system provides a relatively low overhead age compensation system for a display screen. As the method relies on merely tracking if the display screen is active in the retracted or extended positions, relatively little processor capacity is required for implementation. In some example embodiments, more sophisticated methods may be sued for tracking the relative illumination durations of the upper and lower portions 222, 220 of the display screen 204, including for example directly tracking when the pixels or backlighting of the upper portion 222 is activated and when pixels or backlighting of the lower portion 2220 is activated.

Figure 12:
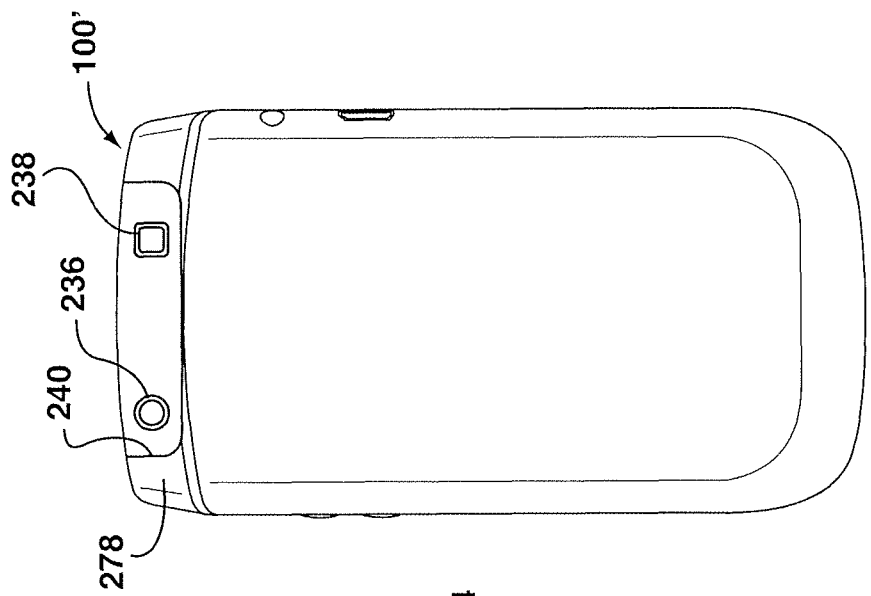
FIG. 12 is a back view of a further example of a handheld electronic communication device, showing the display assembly in the retracted position.

FIG. 12 illustrates a back view of another example of a handheld electronic communication device 100' that is substantially identical to handheld electronic communication device 100 except the back of housing assembly 200 defines an opening 290 that exposes optical sensor 236 and illuminator 238 when display assembly 202 is in its retracted position. The opening 290, which for example could be provided by omitting all or a portion of the cross member 278, facilitates the taking of picture and video when the display assembly 202 is in the retracted position.

Figure 13:
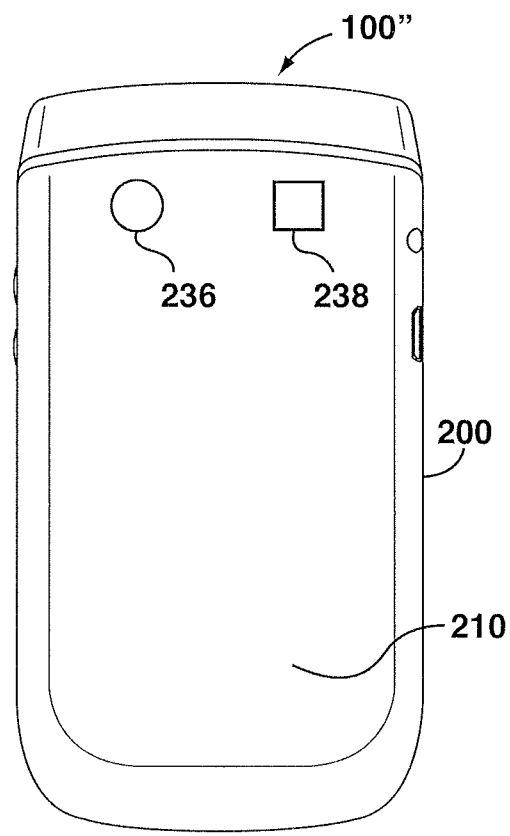
FIG. 13 is a back view of a further example of a handheld electronic communication device, showing the display assembly in the retracted position.

FIG. 13 illustrates a back view of another example of a handheld electronic communication device 100" that is substantially identical to handheld electronic communication device 100 except that the image sensor 236 and illuminator 238 are located on the back of housing assembly 200 rather than the sliding display assembly 202. In such a configuration, the image sensor 236 and illuminator 238 are exposed regardless of the position of the display assembly.

In addition to the sliding display screen configurations described above, the above described examples for compensating differential aging on a display screen can also be applied to other portable electronic device configurations in which the device can be used in a first position with the display screen partially hidden and in a second position with a greater area of the display screen exposed. For example, the age compensating examples described herein could be applied to portable electronic devices having rotating or pivoting display screens in which the display screen is partially hidden in one position (a retracted position) and fully exposed in another position (an extended position). Further, the differential age compensating examples described herein could be applied to portable electronic devices in which the assembly that covers the display screen is something other than a housing assembly having a cavity. For example, the obscuring assembly could be a movable portion such as a keyboard assembly or other member that can partially hide the display screen in one position and fully expose the display screen in another position. For example, a portable electronic device could have a movable keyboard assembly that is located partially over the display screen in a first position and slides or rotates to a second position to expose all of the display screen. In one example, the portable electronic device could have a flip-style keypad assembly that covers part of the display screen in a first position and exposes all of the display screen in a second position, with a position sensor being used to determine when the display screen was partially exposed or fully exposed.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

While the embodiments described herein are directed to particular implementations of the handheld electronic communication device, it will be understood that modifications and variations may occur to those skilled in the art. All such modifications and variations are believed to be within the sphere and scope of the present disclosure.

What is claimed is:

1. A method for compensating for differential aging of a display screen on a handheld electronic device, wherein in a first position a first portion of the display screen is hidden from view while a second portion of the display screen is viewable, and in a second position the first portion and the second portion of the display screen are viewable, comprising:
   tracking over time relative illumination durations of the first and second portions; and
   based on the relative illumination durations, adjusting a relative degree of illumination of one or both of the first portion and the second portion when the display screen is in the second position to compensate for differential aging between the first and second portion;
   wherein the handheld electronic device includes a position sensor for detecting if the first portion of the display screen is hidden from view or is viewable, and wherein tracking over time the relative illumination durations is based on determining in dependence on information received from the position sensor if the first portion of the display screen is hidden from view or is viewable when the display screen is illuminated.

2. The method of claim 1 wherein tracking over time relative illumination durations comprises updating in a memory of the handheld electronic device cumulative time totals that track a total time that the display screen is illuminated when the first portion of the display screen is viewable and a total time that the display screen is illuminated when the first portion of the display screen is hidden from view, wherein illumination of the first portion of the display screen is disabled when the first portion of the display screen is hidden from view.

3. The method of claim 2 wherein an illumination level of the display screen can be set at different values over time, and tracking over time the relative illumination durations includes adjusting the illumination durations in dependence on the set illumination levels.

4. The method of claim 1 wherein adjusting the relative degree of illumination comprises dimming the first portion based on the relative illumination durations of the first portion and the second portion to compensate for the differential aging of the first and second portions.

5. The method of claim 1 comprising, prior to adjusting a relative degree of illumination, determining if a display screen age threshold has been reached and if not then forgoing adjusting a relative degree of illumination such that the relative degree of illumination is only adjusted after the display screen age threshold has been exceeded.

6. The method of claim 5 wherein the display screen age threshold is based on one or both of a total cumulative illumination time of the display screen and an age of the handheld electronic device.

7. The method of claim 1 wherein the display screen comprises an organic light-emitting diode (LED) device.

8. The method of claim 1 wherein the display screen is a sliding display screen, the first position corresponding to a retracted position of the display screen and the second position corresponding to an extending position of the display screen.

9. A non-transitory computer readable medium having stored thereon computer-executable instructions for enabling a processor of a handheld electronic device to carry out the method of claim 1.

10. A handheld electronic device comprising:
    a first assembly;
    a display assembly including a display screen, the display assembly and first assembly being movable relative to each other between a first position in which a first portion of the display screen is hidden from view by the first assembly while a second portion of the display screen is viewable and a second position in which both the first portion and second portion are viewable;
    a processor configured to control operation of the display screen;
    a position sensor for providing position information to the processor indicating if the display assembly and first assembly are in the first position or the second position;
    the processor being configured to disable illumination of the first portion of the display screen and enable illumination of the second portion of the display screen when the position information indicates the first position, and enable illumination of both the first and second portions when the position information indicates the second position, the processor being configured to track over time relative illumination durations of the first portion and the second portion and adjust, in dependence on the tracked relative illumination durations, a relative degree of illumination of one or both of the first portion and the second portion to compensate for differential display screen aging;
    wherein the processor is configured to track over time the relative illumination durations of the first portion or the second portion based on a position as sensed by the position sensor when the display screen is illuminated.

11. The handheld device of claim 10 wherein the processor is configured to update in a memory of the handheld electronic device cumulative time totals that track a total time that the display screen is illuminated when in the second position and a total time that the display screen is illuminated when in the first position.

12. The handheld electronic device of claim 10 wherein an illumination level of the display screen can be set at different values over time, and the processor is configured to adjust the illumination durations in dependence on the set illumination levels.

13. The handheld electronic device of claim 10 wherein the processor is configured to reduce the relative degree of illumination of the lower portion by a compensation factor to compensate for the differential display screen aging.

14. The handheld electronic device of claim 10 wherein, prior to adjusting a relative degree of illumination, the processor is configured to determine if a display screen age threshold has been reached and if not then forgo adjusting the relative degree of illumination such that the relative degree of illumination is only adjusted after the display screen age threshold has been exceeded.

15. The handheld electronic device of claim 14 wherein the display screen age threshold is based on one or both of a total cumulative illumination time of the display screen and an age of the handheld electronic device.

16. The handheld electronic device of claim 10 wherein the display screen comprises pixels that are made up of different coloured sub-pixels and adjusting the relative degree of illumination comprises adjusting, based on colour, degrees of illuminations of the different subpixels in the display screen to compensate for the differential aging of the different sub-pixels.

17. The handheld electronic device of claim 10 wherein the display screen comprises an organic light-emitted diode (LED) device.

18. The handheld electronic device of claim 10 wherein the first assembly is a housing assembly having a cavity, and the display assembly is slidably mounted to the housing assembly, the first position corresponding to a retracted position of the display assembly in which the first portion of the display screen is received within the cavity and the second portion of the display screen is viewable outside of the cavity, and the second position corresponds to an extended position of the display screen assembly in which the first portion and second portion of the display screen are both viewable outside of the cavity.

* * * * *